(12) United States Patent
Umeki et al.

(10) Patent No.: US 12,306,199 B2
(45) Date of Patent: May 20, 2025

(54) SPECIMEN PROCESSING SYSTEM

(71) Applicant: Hitachi High-Tech Corporation, Tokyo (JP)

(72) Inventors: Taro Umeki, Tokyo (JP); Shigeru Yano, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 535 days.

(21) Appl. No.: 16/645,838

(22) PCT Filed: Nov. 21, 2018

(86) PCT No.: PCT/JP2018/042928
§ 371 (c)(1),
(2) Date: Mar. 10, 2020

(87) PCT Pub. No.: WO2019/138700
PCT Pub. Date: Jul. 18, 2019

(65) Prior Publication Data
US 2020/0200782 A1 Jun. 25, 2020

(30) Foreign Application Priority Data

Jan. 10, 2018 (JP) .................................. 2018-001745

(51) Int. Cl.
G01N 35/04 (2006.01)
G01N 35/02 (2006.01)

(52) U.S. Cl.
CPC ........... *G01N 35/04* (2013.01); *G01N 35/026* (2013.01); *G01N 2035/0406* (2013.01);
(Continued)

(58) Field of Classification Search
CPC ................. G01N 35/04; G01N 35/026; G01N 2035/0427; G01N 2035/046; G01N 2035/0462; G01N 2035/0406
See application file for complete search history.

(56) References Cited

U.S. PATENT DOCUMENTS 6,202,829 B1 * 3/2001 van Dyke, Jr. ........ G01N 35/04
198/459.7
2012/0177547 A1 7/2012 Fukugaki et al.
(Continued)

FOREIGN PATENT DOCUMENTS

EP 2693220 A2 2/2014
JP 2015096833 A * 5/2015
(Continued)

OTHER PUBLICATIONS

International Search Report, PCT/JP2018/042928, Feb. 26, 2019, 2 pgs.
(Continued)

Primary Examiner — John McGuirk
(74) Attorney, Agent, or Firm — Volpe Koenig

(57) ABSTRACT

Provided is a specimen processing system which can contribute to space saving. The specimen processing system includes a put-in module which puts a specimen on a put-in tray in a holder, a housing module which houses the specimen from the holder in a housing tray, and a stock module which stocks the holder, in which an empty holder which is generated because the specimen is housed is directly conveyed to the put-in module without being conveyed to the stock module and is used for putting a new specimen therein.

8 Claims, 7 Drawing Sheets

(52) U.S. Cl.
CPC ............ *G01N 2035/0427* (2013.01); *G01N 2035/046* (2013.01); *G01N 2035/0462* (2013.01)

(56) References Cited

U.S. PATENT DOCUMENTS

| | | | |
|---|---|---|---|
| 2013/0197690 A1* | 8/2013 | Suzuki | G01N 35/0092 700/216 |
| 2016/0202279 A1* | 7/2016 | Endo | G01N 35/04 73/863.01 |
| 2018/0246131 A1 | 8/2018 | Yamaguchi et al. | |
| 2019/0170780 A1 | 6/2019 | Matsuka et al. | |

FOREIGN PATENT DOCUMENTS

| | | |
|---|---|---|
| JP | 2015-121562 A | 7/2015 |
| JP | 2016-138811 A | 8/2016 |
| WO | 2017/051642 A1 | 3/2017 |
| WO | 2018/034095 A1 | 2/2018 |

OTHER PUBLICATIONS

Extended European Search Report issued on Sep. 7, 2021 for European Patent Application No. 18900546.5.

* cited by examiner

SPECIMEN PROCESSING SYSTEM

TECHNICAL FIELD

The present invention pertains to a specimen processing system into which a plurality of modules are incorporated and relates to a technology which promotes space saving of the specimen processing system.

BACKGROUND ART

Specimens of blood, urine and so forth which are provided by a patient and others are subjected to analysis for clinical examinations by using the specimen processing system in hospitals and examination facilities. In the specimen processing system, prior to the analysis of the specimens, preprocessing such as centrifugal separation, plug-opening and dispensation is performed by dedicated modules. Further, a put-in module which puts the specimen in a module which performs the preprocessing and a housing module which houses the specimen whose analysis is finished are incorporated into the specimen processing system. In Patent Literature 1, it is disclosed that in the specimen processing system into which the plurality of modules are incorporated, an empty holder which is a holder which finishes housing a specimen is conveyed to a loop-shaped empty holder conveyance path and the empty holder which is needed when the specimen is to be put therein is supplied from the empty holder conveyance path to a main conveyance path.

CITATION LIST

Patent Literature

Patent Literature 1: Japanese Patent Application Laid-Open No. 2015-121562

SUMMARY OF INVENTION

Technical Problem

However, in the specimen processing system which is disclosed in Patent Literature 1, since the empty holder which finishes housing the specimen is once stocked on the empty holder conveyance path and in a stock module which stocks the empty holder, there are cases where it is not suited for space saving of the system judging from the required number of the empty holders which are used in a facility. In a large-scale facility, hundreds to thousands of specimens are processed per day and the stock module is upsized so as to make it possible to stock the empty holders for the number of the processed ones.

Incidentally, the empty holder which finishes housing the specimen is not necessarily stocked in the stock module and may be directly used for putting the specimen therein. That is, the number of the empty holders which are stocked in the stock module can be suppressed by appropriately conveying the empty holder which finishes housing the specimen.

Accordingly, the present invention aims to provide a specimen processing system which can contribute to space saving.

Solution to Problem

In order to attain the above-mentioned aim, the present invention is a specimen processing system which includes a put-in module which puts a specimen on a put-in tray in a holder, a housing module which houses the specimen from the holder in a housing tray and a stock module which stocks the holder, in which an empty holder which is generated because the specimen is housed is directly conveyed to the put-in module without being conveyed to the stock module and is used for putting a new specimen therein.

Advantageous Effects of the Invention

According to the present invention, there can be provided the specimen processing system which can contribute to the space saving.

DESCRIPTION OF EMBODIMENTS

First Embodiment

In the following, the present embodiment will be described with reference to the drawings.

Figure 1:
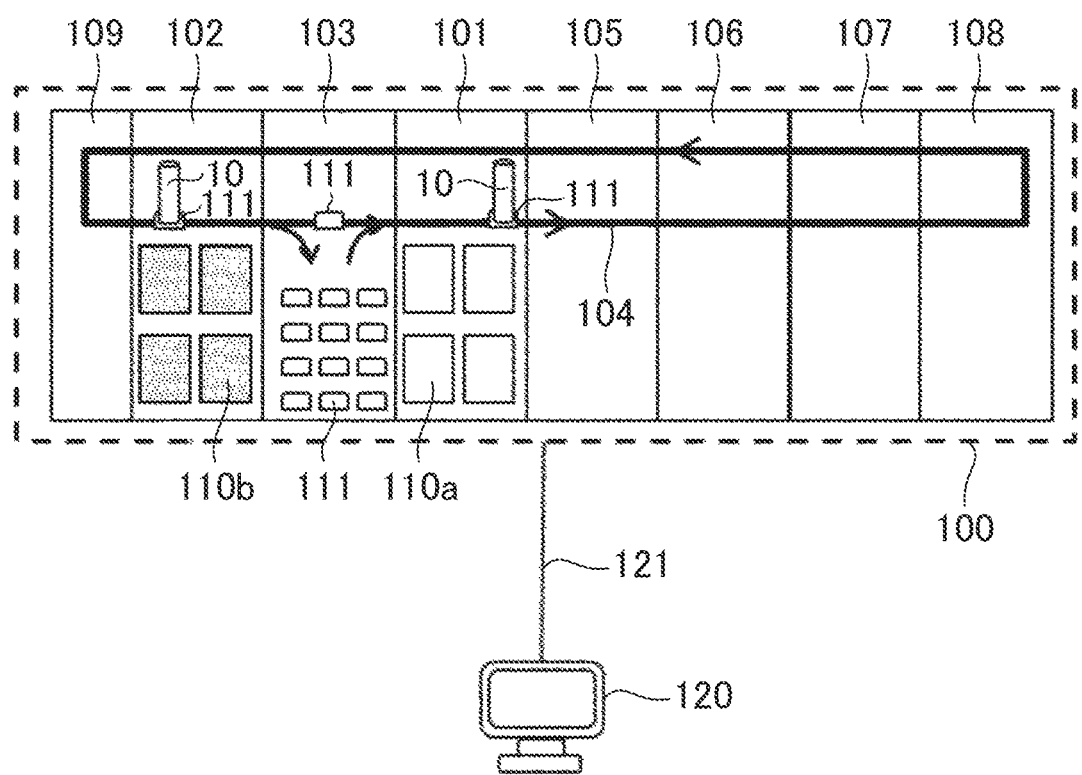
FIG. 1 is a diagram illustrating one example of an overall configuration of a specimen processing system of a first embodiment.

As illustrated in FIG. 1, a specimen processing system 100 of the present embodiment is equipped with a put-in module 101, a housing module 102, a stock module 103, a centrifugal separation module 105, a plug-opening module 106, a dispensing module 107, an analysis module 108, a plug-closing module 109, and a computer 120 for control.

In the following, each part will be explained in processing order.

In the put-in module 101, a specimen 10 which is put on a put-in tray 110a is transferred to a holder 111 which flows on a main conveyance path 104. That is, the specimen 10 is put therein. The put-in tray 110a is a carrier on which a plurality of numbers, for example, fifty to one hundred specimens 10 are put and the specimens 10 which are processing objects are put thereon. The specimens 10 are blood, urine and so forth which are collected from a patient and are put in containers having openable-closable plugs. Barcodes and so forth which are used for identification of the specimens 10 are pasted on the containers. The holder 111 is a carrier on which one specimen 10 is put. Incidentally, the holder 111 on which no specimen 10 is put is called an empty holder and the holder 111 on which the specimen 10 is put is called a mounted holder.

In the centrifugal separation module 105, centrifugal separation processing is performed on the specimen 10 and the specimen 10 is separated into each component. In the plug-opening module 106, a plug of the container of the specimen 10 is opened. In the dispensing module 107, dispensing processing is performed on the specimen 10. In the analysis module 108, the specimen 10 is analyzed.

The analyzed specimen 10 is conveyed to the plug-closing module 109 passing through the respective modules in order of the dispensing module 107, the plug-opening module 106, the centrifugal separation module 105, the put-in module 101, the stock module 103, and the housing module 102. In the plug-closing module 109, the plug of the container of the specimen 10 is closed.

In the housing module 102, the specimen 10 that a series of processing thereon is terminated is transferred from the holder 111 to a housing tray 110b. That is, the specimen 10 is housed and the mounted holder becomes the empty holder. The housing tray 110b is a carrier on which the plurality of numbers, for example, fifty to one thousand specimens 10 are put similarly to the put-in tray 110a. However, a purpose of use thereof is different from that of the put-in tray 110a and the specimen 10 that the series of processing thereon is terminated is put thereon.

In the stock module 103, collection of the empty holder which is generated in the housing module 102, stocking of the plurality of holders 111 and supply of the holder 111 to the put-in module 101 are performed. A flow of the holder 111 in the stock module 103 will be described later using FIG. 2 and FIG. 3 while correlating with detailed structures and operations of the put-in module 101 and the housing module 102.

The computer 120 for control is connected with each module via a communication line 121 and controls the operation of each module on the basis of information which is acquired by sensors and so forth that each module has. The computer 120 for control identifies the type of the specimen 10, for example, by inquiring a data list which is stored in the computer 120 for control about information which is acquired by reading out the barcode on the specimen 10 and makes it skip the processing in each module as required. More specifically, when the control use computer 120 identifies that the specimen 10 is urine, it makes it skip the processing in the centrifugal separation module 105 because the centrifugal separation processing is not necessary for the urine.

Figure 2:
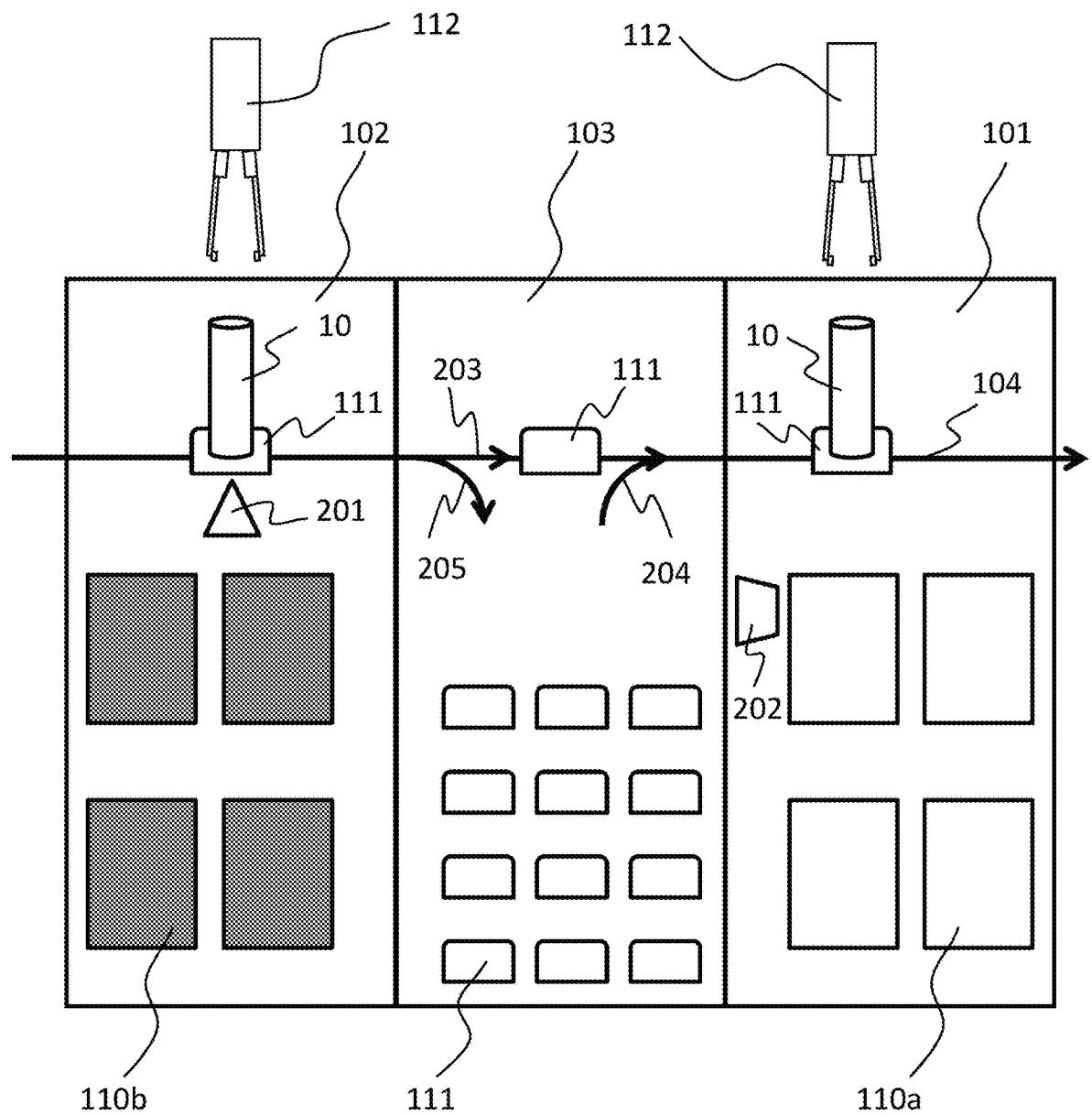
FIG. 2 is a diagram explaining a detailed structure of the first embodiment.

The detailed structures of the housing module 102, the put-in module 101, and the stock module 103 will be explained using FIG. 2. The housing module 102 has a specimen sensor 201 which is a sensor for sensing the specimen 10 which reaches the housing module 102. The put-in module 101 has a tray sensor 202 which is a sensor for sensing the put-in tray 110a in the put-in module 101.

The stock module 103 is arranged between the housing module 102 and the put-in module 101 and has a straight advance path 203 and a supply path 204 and a collection path 205. The straight advance path 203 is a path for advancing the empty holder which is generated in the housing module 102 straight and conveying it to the main conveyance path 104 without stocking it in the stock module 103. The supply path 204 is a path for supplying the holder 111 which is stocked in the stock module 103 to the main conveyance path 104. The collection path 205 is a path for collecting the holder 111 and the collected holder 111 is stocked in the stock module 103.

Figure 3:
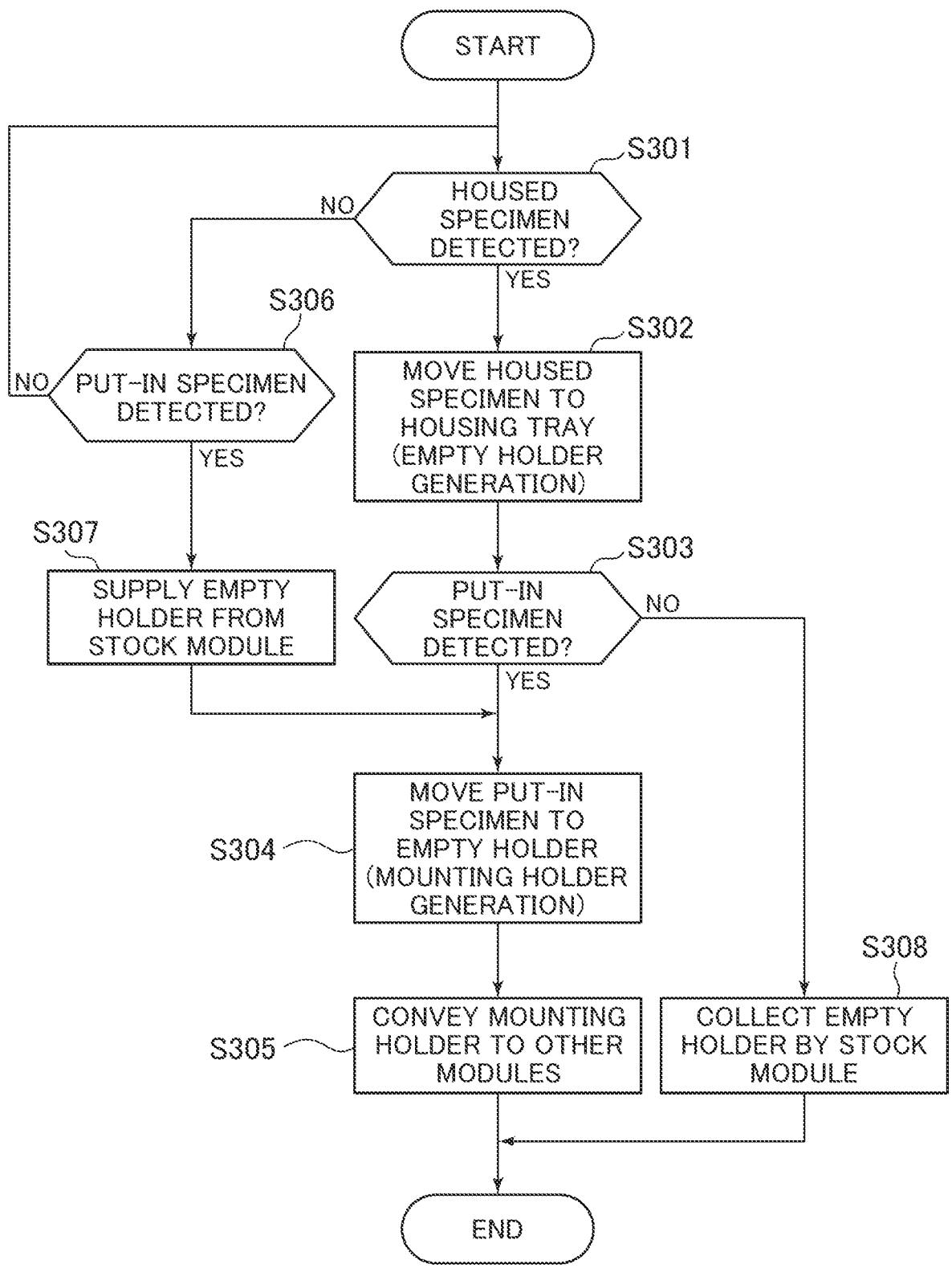
FIG. 3 is a diagram explaining a flowchart of the first embodiment.

A flowchart pertaining to the flow of the holder 111 in the stock module 103 is shown in FIG. 3 and respective steps will be explained.
(S301)
The computer 120 for control decides whether a housed specimen which is a specimen to be housed reaches the housing module 102 on the basis of a sensing signal from the specimen sensor 201. When the housed specimen is sensed, the process proceeds to S302 and when it is not sensed, the process proceeds to S306. Incidentally, since in the present step, it is enough to make it possible to decide whether the housed specimen reaches the housing module 102, another sensor, for example, a sensor for sensing the holder 111 may be used, not limited to the specimen sensor 201.
(S302)
The computer 120 for control instructs the housing module 102 to transfer the housed specimen to the housing tray 110b. That is, the specimen 10 is housed therein and the empty holder is generated. A chuck mechanism 112 is used for transfer of the housed specimen.

(S303) The computer 120 for control decides whether a put-in specimen which is a specimen to be put in is present in the put-in module 101 on the basis of a sensing signal from the tray sensor 202. When the put-in specimen is present, toe the process proceeds to S304 and when the put-in specimen is not present, the process proceeds to S308. In a case where the process proceeds to S304, the empty holder which is generated in S302 is conveyed to the straight advance path 203 and is used for putting a new specimen 10 therein in the put-in module 101. Incidentally, since in the present step, it is enough to make it possible to decide whether the put-in specimen is present in the put-in module 101, another sensor, for example, a sensor for sensing each specimen 10 on the put-in tray 110a may be used, not limited to the tray sensor 202.
(S304)
The computer 120 for control instructs the put-in module 101 to transfer the put-in specimen on the put-in tray 110a to the empty holder on the main conveyance path 104. That is, the specimen 10 which is the processing object is put therein and the mounted holder is generated. A not illustrated chuck mechanism 112 is used for transfer of the put-in specimen.
(S305)
The computer 120 for control instructs each module to convey the mounting holder to the centrifugal separation module 105 and so forth such that predetermined processing is performed on the basis of barcode reading.
(S306)
The computer 120 for control decides whether the put-in specimen which is the specimen to be put in is present in the put-in module 101 on the basis of the sensing signal from the tray sensor 202. When the put-in specimen is present, the process proceeds to S307 and when the put-in specimen is not present, the process returns to S301. Incidentally, since in the present step, it is enough to make it possible to decide whether the put-in specimen is present in the put-in module 101, another sensor may be used, not limited to the tray sensor 202.
(S307)
The computer 120 for control makes the stock module 103 supply the empty holder. That is, the holder 111 which is stocked in the stock module 103 is conveyed to the supply path 204. The empty holder which is conveyed to the supply path 204 is used for putting a new specimen 10 therein in the put-in module 101.
(S308)
The computer 120 for control makes the stock module 103 collect the empty holder. That is, the empty holder which is generated in the housing module 102 is conveyed to the collection path 205. The empty holder is collected and thereby the empty holders which stay on the main conveyance path 104 can be reduced.

Owing to the above-described configuration, since the empty holder which finishes housing the specimen comes to be directly used for putting the specimen therein and the number of the holders 111 which are stocked in the stock module 103 can be reduced, there can be provided the specimen processing system 100 which can contribute to the space saving. In particular, since it is decided whether the empty holder which finishes housing the specimen is directly conveyed to the put-in module 101 without stocking it in the stock module 103 or is once stocked in the stock module 103 in accordance with presence/absence of the put-in specimen, unnecessary staying of the empty holder and upsizing of the stock module 103 which accompanies therewith can be avoided. Upsizing of the stock module 103 is not needed and thereby the space saving of the specimen processing system can be promoted.

Second Embodiment

It was explained in the first embodiment that in the specimen processing system 100 which is equipped with the housing module 102, the put-in module 101 and the stock module 103, a conveyance destination of the empty holder which finishes housing the specimen is decided depending on presence/absence of the put-in specimen. For space saving of the specimen processing system, the housing module 102 and the put-in module 101 may be integrated with each other. In the present embodiment, a case where the housing module 102 and the put-in module 101 are integrated with each other will be explained.

Figure 4:
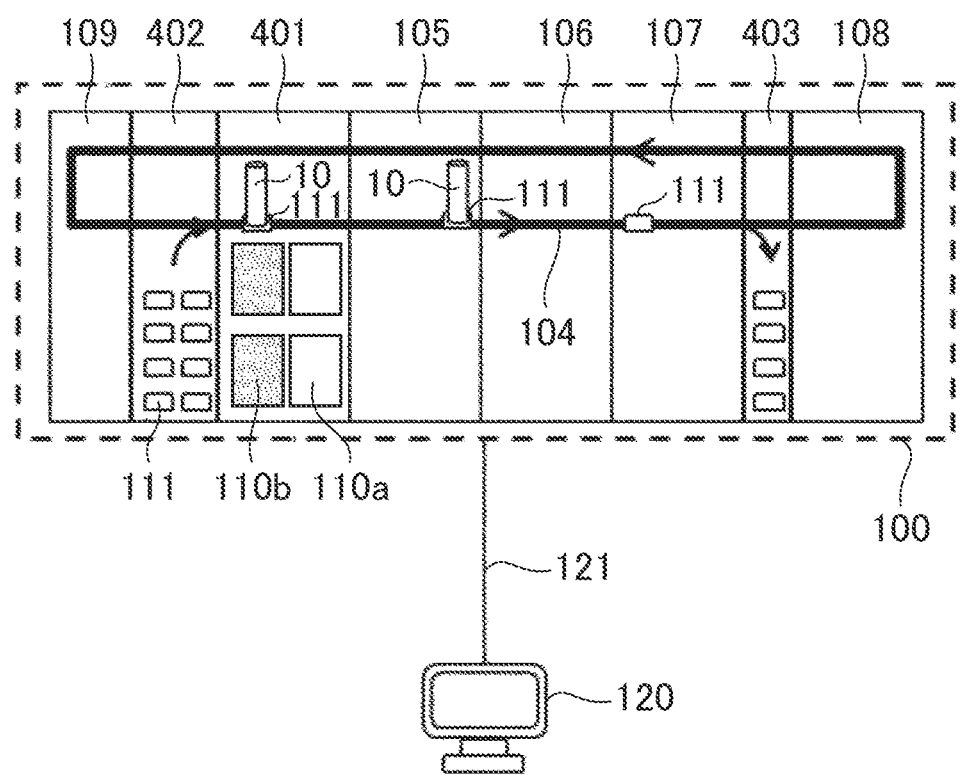
FIG. 4 is a diagram illustrating one example of an overall configuration of a specimen processing system of a second embodiment.

An overall configuration of the specimen processing system 100 of the present embodiment will be explained by using FIG. 4. The specimen processing system 100 is equipped with a put-in/housing integrated module 401, a supply stock module 402, a collection stock module 403, the centrifugal separation module 105, the plug-opening module 106, the dispensing module 107, the analysis module 108, the plug-closing module 109, and the computer 120 for control. The put-in/housing integrated module 401, the supply stock module 402 and the collection stock module 403 which are configurations which are different from those in the first embodiment will be described.

The put-in/housing integrated module 401 is a module that the housing module 102 and the put-in module 101 in the first embodiment are integrated with each other by being arranged adjacent to each other and performs transfer of the specimen 10 from the mounted holder to the housing tray 110b and transfer of the specimen 10 from the put-in tray 110a to the empty holder. That is, it performs housing and putting-in of the specimen 10.

In the supply stock module 402, the holder 111 which is stocked in the supply stock module 402 is supplied to the main conveyance path 104 as required. In the collection stock module 403, the empty holder which flows on the main conveyance path 104 is collected. A flow of processing that the holder 111 is supplied or collected will be described later by using FIG. 6.

Figure 5:
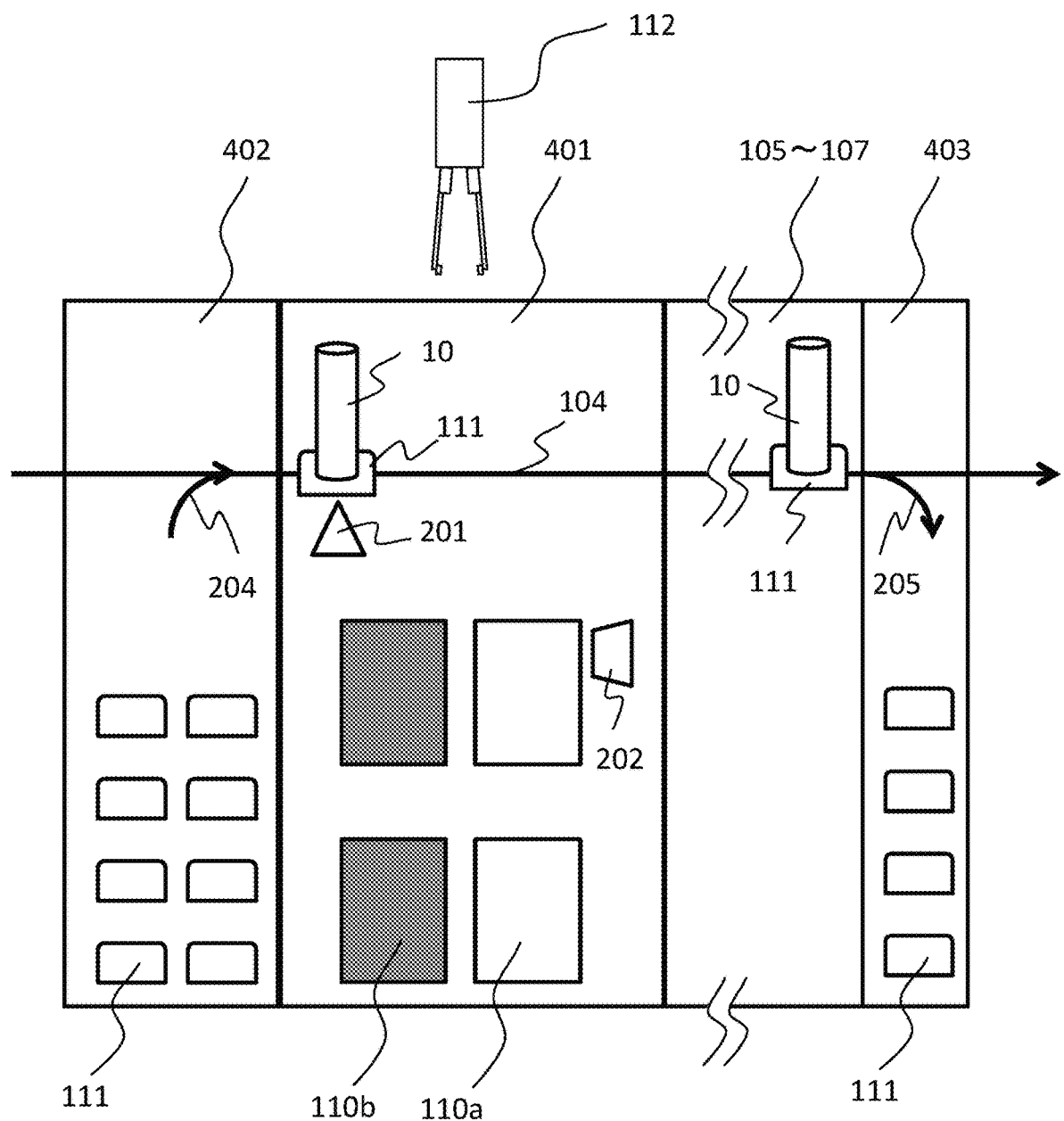
FIG. 5 is a diagram explaining a detailed structure of the second embodiment.

Detailed structures of the put-in/housing integrated module 401, the supply stock module 402, and the collection stock module 403 will be explained by using FIG. 5. The put-in/housing integrated module 401 has the specimen sensor 201 which is the sensor for sensing the specimen 10 which reaches the put-in/housing integrated module 401 and the tray sensor 202 which is the sensor for sensing the put-in tray 110a in the put-in/housing integrated module 401. The supply stock module 402 has the supply path 204 for supplying the holder 111 which is stocked in the supply stock module 402 to the main conveyance path 104. The collection stock module 403 has the collection path 205 for collecting the empty holder which reaches the collection stock module 403. The put-in/housing integrated module 401 may be arranged between the supply stock module 402 and the collection stock module 403 and the centrifugal separation module 105, the plug-opening module 106, the dispensing module 107 and so forth may be arranged between the put-in/housing integrated module 401 and the collection stock module 403.

Figure 6:
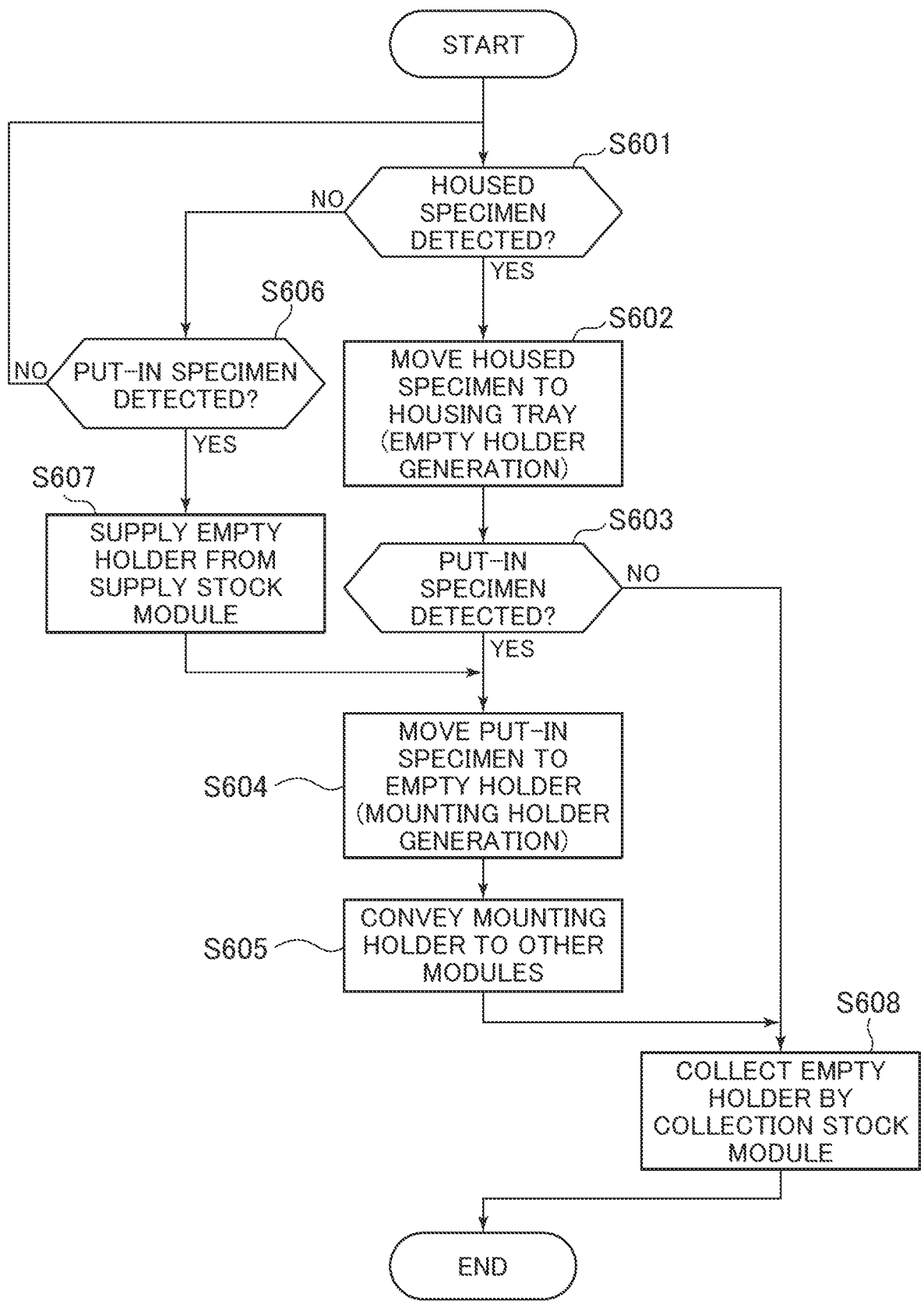
FIG. 6 is a diagram explaining a flowchart of the second embodiment.

A flowchart pertaining to the flow of the holder 111 in the put-in/housing integrated module 401, the supply stock module 402, and the collection stock module 403 is shown in FIG. 6 and respective steps will be explained.
(S601)
The computer 120 for control decides whether the housed specimen reaches the put-in/housing integrated module 401 on the basis of the sensing signal from the specimen sensor 201. When the housed specimen is sensed, the process proceeds to S602 and when it is not sensed, the process proceeds to S606. Incidentally, since in the present step, it is enough to make it possible to decide whether the housed specimen reaches the put-in/housing integrated module 401, another sensor may be used, not limited to the specimen sensor 201.
(S602)
The computer 120 for control instructs the put-in/housing integrated module 401 to transfer the housed specimen to the housing tray 110b. That is, the specimen 10 is housed and the empty holder is generated. The chuck mechanism 112 is used for transfer of the housed specimen.
(S603)
The computer 120 for control decides whether the put-in specimen is present in the put-in/housing integrated module 401 on the basis of the sensing signal from the tray sensor 202. When the put-in specimen is present, the process proceeds to S604 and the empty holder which is generated in S602 is used for putting a new specimen 10 therein. When the put-in specimen is not present, the process proceeds to S608 and the empty holder which is generated in S602 flows on the main conveyance path 104. Incidentally, since in the present step, it is enough to make it possible to decide whether the put-in specimen is present in the put-in/housing integrated module 401, another sensor may be used, not limited to the tray sensor 202.
(S604)
The computer 120 for control instructs the put-in/housing integrated module 401 to transfer the put-in specimen on the put-in tray 110a to the empty holder on the main conveyance path 104. That is, the specimen 10 which is the processing object is put therein and the mounted holder is generated. The chuck mechanism 112 is used for transfer of the put-in specimen.
(S605)
The computer 120 for control instructs the respective modules to transfer the mounted holder to the centrifugal separation module 105 and so forth such that the predetermined processing is performed on the basis of barcode reading.
(S606)
The computer 120 for control decides whether the put-in specimen is present in the put-in/housing integrated module 401 on the basis of the sensing signal from the tray sensor 202. When the put-in specimen is present, the process proceeds to S607 and when the put-in specimen is not present, the process returns to S601. Incidentally, since in the present step, it is enough to make it possible to decide whether the put-in specimen is present in the put-in/housing integrated module 401, another sensor may be used, not limited to the tray sensor 202.

(S607)

The computer 120 for control makes the supply stock module 402 supply the empty holder. That is, the holder 111 which is stocked in the supply stock module 402 is conveyed to the supply path 204. The empty holder which is conveyed to the supply path 204 is used for putting a new specimen 10 therein in the put-in/housing integrated module 401.

(S608)

The computer 120 for control makes the collection stock module 403 collect the empty holder. That is, the empty holder which reaches the collection stock module 403 is conveyed to the collection path 205. The empty holder which is collected in the present step is not limited to the empty holder which is generated in the put-in/housing integrated module 401, also empty holders which are generated in the centrifugal separation module 105, the plug-opening module 106, and the dispensing module 107 for some reason are included. The empty holders are collected and thereby the empty holders which stay on the main conveyance path 104 can be reduced. Incidentally, the mounted holder which reaches the collection stock module 403 is not collected and keeps flowing on the main conveyance path 104.

Owing to the above-explained configuration, since the put-in module 101 and the housing module 102 are integrated with each other and the empty holder which finishes housing the specimen is directly used for putting the specimen therein, there can be provided the specimen processing system 100 which can contribute to the space saving. In particular, since the empty holder which finishes housing the specimen is directly used for putting-in, the supply stock module 402 can be downsized.

Third Embodiment

It was explained in the second embodiment that the empty holder which finishes housing the specimen is directly used for putting the specimen therein in the specimen processing system which is equipped with the put-in/housing integrated module. When the empty holder is generated in the put-in/housing integrated module in the absence of the specimen to be put therein, unnecessary empty holders flow on the main conveyance path and reduce an operation rate of the specimen processing system. Accordingly, in the present embodiment, that the empty holder is transferred to a dedicated path which is different from the main conveyance path in order to avoid a reduction in operation rate will be explained. Incidentally, since the overall configuration of the present embodiment is the same as that of the second embodiment, explanation thereof is omitted.

Figure 7:
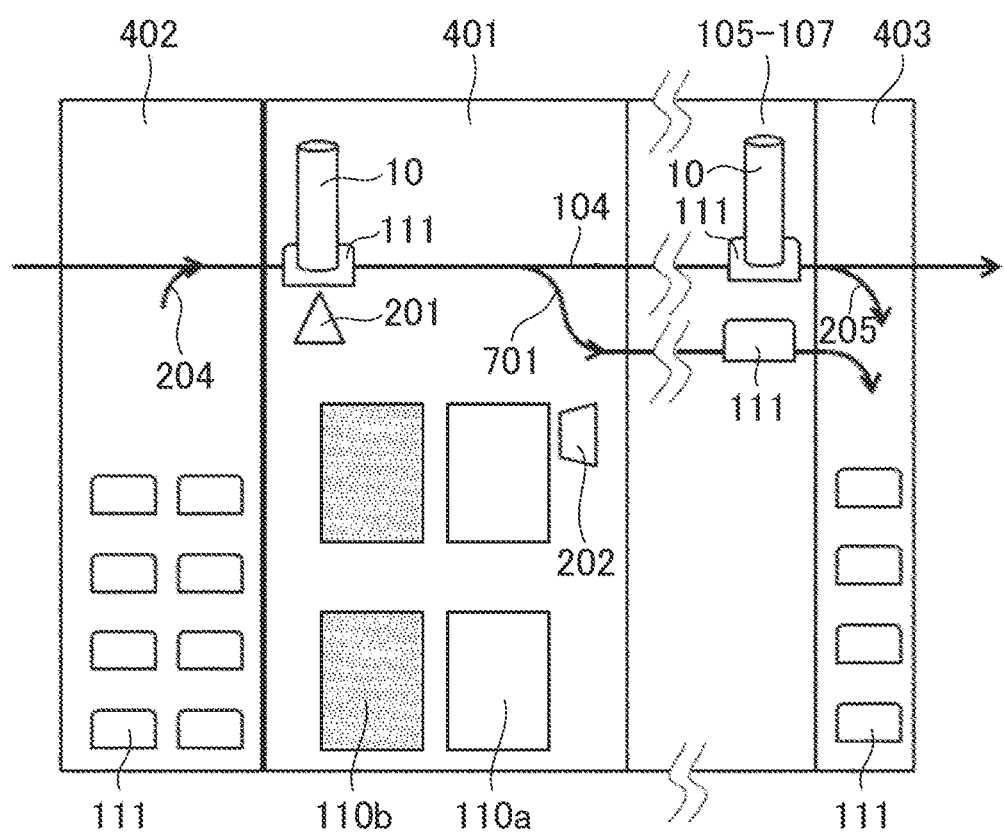
FIG. 7 is a diagram explaining a flow of an empty holder in a third embodiment.

The detailed structures of the put-in/housing integrated module 401, the supply stock module 402 and the collection stock module 403 will be explained by using FIG. 7. The put-in/housing integrated module 401 has the specimen sensor 201 and the tray sensor 202 similarly to that in the second embodiment and has an empty holder dedicated path 701. The empty holder dedicated path 701 is a path which conveys only the empty holder. The supply stock module 402 is the same as that in the second embodiment. The collection stock module 403 has the collection path 205 similarly to that in the second embodiment and the empty holder dedicated path 701 is connected thereto. The empty holder which reaches the collection stock module 403 via the empty holder dedicated path 701 is collected and stocked in the collection stock module 403.

Since the flowchart of the present embodiment is the same as that in the second embodiment except S603 and S608, S603 and S608 will be explained here and explanation of other steps is omitted.

(S603)

The computer 120 for control decides whether the put-in specimen is present in the put-in/housing integrated module 401 on the basis of the sensing signal from the tray sensor 202. When the put-in specimen is present, the process proceeds to S604 and when the put-in specimen is not present, the process proceeds to S608. In a case where the process proceeds to S608, the empty holder which is generated in S602 is conveyed to the empty holder dedicated path 701.

(S608)

The computer 120 for control makes the collection stock module 403 collect the empty holder. The empty holder which is generated in the put-in/housing integrated module 401 is collected via the empty holder dedicated path 701. In addition, empty holders which are generated in the centrifugal separation module 105, the plug-opening module 106 and the dispensing module 107 for some reason are collected via the collection path 205. Incidentally, the mounted holder which reaches the collection stock module 403 is not collected and keeps flowing on the main conveyance path 104.

Owing to the above-explained configuration, since the empty holder which is generated in the put-in/housing integrated module 401 is conveyed to the collection stock module 403 via the empty holder dedicated path 701, the empty holders on the main conveyance path are reduced and it becomes possible to improve the operation rate of the specimen processing system 100. Incidentally, the space saving of the specimen processing system 100 owing to integration of the put-in module 101 with the housing module 102 and downsizing of the supply stock module 402 is the same as that in the second embodiment.

Incidentally, the examination processing system of the present invention is not limited to the above-described embodiments and can be embodied by modifying constitutional elements within a range not deviating from the gist of the invention. In addition, a plurality of constitutional elements which are disclosed in the above-mentioned embodiments may be appropriately combined with one another. Further, some constitutional elements may be deleted from all the constitutional elements which are indicated in the above-described embodiments.

REFERENCE SIGNS LIST

10 specimen, 100 specimen processing system, 101 put-in module, 102 housing module, 103 stock module, 104 main conveyance path, 105 centrifugal separation module, 106 plug-opening module, 107 dispensing module, 108 analysis module, 109 plug-closing module, 110*a* put-in tray, 110*b* housing tray, 111 holder, 120 computer for control, 121 communication line, 201 specimen sensor, 202 tray sensor, 203 straight advance path, 204 supply path, 205 collection path, 401 put-in/housing integrated module, 402 supply stock module, 403 collection stock module, 701 empty holder dedicated path

The invention claimed is:

1. A specimen processing system comprising:
a chuck mechanism;

a housing module that houses a specimen as a housed specimen, and transfers, via the chuck mechanism, the housed specimen from a holder to a housing tray within the housing module thereby generating an empty holder;

a put-in module that transfers, via the chuck mechanism, a different specimen from a put-in tray in the put-in module to the empty holder on a condition that the different specimen is present in the put-in module, wherein the housed specimen and the different specimen each have a unique barcode containing identifying information;

a stock module that houses the empty holder;

a conveyor that connects the housing module, the stock module, and the put-in module;

a tray sensor that senses the put-in tray in the put-in module; and a processor that is communicatively coupled to the chuck mechanism, the housing module, and the put-in module, wherein the processor:

controls the housing module, the put-in module, the stock module, and the conveyor, and determines, via at least one signal from the tray sensor, whether the different specimen is present in the put-in module, on the condition that the different specimen is present in the put-in module, the processor controls the empty holder via the conveyor, such that the empty holder is directly conveyed from the housing module to the put-in module without being stocked in the stock module and the empty holder is used for putting the different specimen therein, controls the put-in module to transfer, via the chuck mechanism, the different specimen that is present in the put-in module to the empty holder, generating a mounted holder, and receives the identifying information from the unique barcode of the different specimen in the mounted holder and creates a processing path for the different specimen in the mounted holder based on the identifying information, and on a condition that the different specimen is not present in the put-in module, the processor controls the empty holder via a collection path on the conveyor, and stocks the empty holder in the stock module, wherein the processing path and the collection path are different, and wherein the stock module is arranged in between and physically separates the housing module from the put-in module, such that in a processing order the empty holder moves from the housing module, through the stock module, and then to the put-in module.

2. The specimen processing system according to claim 1, wherein the processor controls the stock module such that on a condition that the different specimen is present in the put-in module at the time of generation of the empty holder, the stock module conveys, via the conveyor, the empty holder to the put-in module, and on a condition that the different specimen is not present in the put-in module at the time of generation of the empty holder, the stock module collects and holds the empty holder.

3. The specimen processing system according to claim 1, further comprising:

an empty holder dedicated path on the conveyor that connects between the put-in module and the stock module, and is adapted to convey the empty holder, and wherein the processing path, the collection path, and the empty holder dedicated path are each different.

4. The specimen processing system according to claim 2, wherein on the condition that the different specimen is present in the put-in module at the time of generation of the empty holder, the stock module supplies the empty holder, which is stocked in the housing module, to the put-in module.

5. The specimen processing system according to claim 1, wherein on the condition that the different specimen is present in the put-in module at the time of generation of the empty holder, the stock module supplies the empty holder, which is stocked in the housing module, to the put-in module.

6. The specimen processing system according to claim 3, wherein on the condition that the different specimen is present in the put-in module at the time of generation of the empty holder, the stock module supplies the empty holder, which is stocked in the housing module, to the put-in module.

7. A specimen processing system comprising:

a chuck mechanism;

a specimen;

a holder;

an empty holder being the holder without the specimen;

a housing module including a housing tray that houses the specimen as a housed specimen, and transfers, via the chuck mechanism, the housed specimen from the holder to the housing tray thereby generating the empty holder;

a put-in module including a put-in tray and a tray sensor that senses the put-in tray, and transfers, via the chuck mechanism, a different specimen from the put-in tray to the empty holder on a condition that the different specimen is present in the put-in module, wherein the housed specimen and the different specimen each have a unique barcode containing identifying information;

a stock module that houses the empty holder;

a conveyor that connects the housing module, the stock module, and the put-in module; and a processor that is communicatively coupled to the chuck mechanism, the housing module, and the put-in module, wherein the processor:

controls the housing module, the put-in module, the stock module, and the conveyor, and determines, via at least one signal from the tray sensor, whether the different specimen is present in the put-in module, on the condition that the different specimen is present in the put-in module, the processor controls the empty holder via the conveyor, such that the empty holder is directly conveyed from the housing module to the put-in module without being stocked in the stock module and the empty holder is used for putting the different specimen therein, controls the put-in module to transfer, via the chuck mechanism, the different specimen that is present in the put-in module to the empty holder, generating a mounted holder, and receives the identifying information from the unique barcode of the different specimen in the mounted holder and creates a processing path for the different specimen in the mounted holder based on the identifying information, and on a condition that the different specimen is not present in the put-in module, the processor controls the empty holder via a collection path on the conveyor, and stocks the empty holder in the stock module, wherein the processing path and the collection path are different, and wherein the stock module is arranged in between and physically separates the housing module from the put-in module, such that in a processing order the empty holder moves from the housing module, through the stock module, and then to the put-in module.

8. A specimen processing method comprising:

housing, in a housing module, a housing tray that includes a specimen as a housed specimen, transferring, via a chuck mechanism, the housed specimen from a holder to the housing tray thereby generating an empty holder;

housing the empty holder, in a stock module;

transferring, via the chuck mechanism, a different specimen from a put-in tray in a put-in module to the empty holder on a condition that the different specimen is present in the put-in module, wherein the housed specimen and the different specimen each have a unique barcode containing identifying information, wherein the housing module, the stock module, and the put-in module are connected via a conveyor;

sensing, via a tray sensor, the put-in tray in the put-in module;

determining, via at least one signal from the tray sensor, whether the different specimen is present in the put-in module, on the condition that the different specimen is present in the put-in module, controlling the empty holder via the conveyor, such that the empty holder is directly conveyed from the housing module to the put-in module without being stocked in the stock module and the empty holder is used for putting the different specimen therein, transferring, via the chuck mechanism, the different specimen present in the put-in module to the empty holder, and generating a mounted holder, receiving the identifying information from the unique barcode of the different specimen in the mounted holder, and creating a processing path for the different specimen in the mounted holder based on the identifying information, and on a condition that the different specimen is not present in the put-in module, controlling the empty holder via a collection path on the conveyor, and stocking the empty holder in the stock module, wherein the processing path and the collection path are different, and wherein the stock module is arranged in between and physically separates the housing module from the put-in module, such that in a processing order the empty holder moves from the housing module, through the stock module, and then to the put-in module.

* * * * *